US011370290B2

(12) United States Patent
Finkenzeller et al.

(10) Patent No.: US 11,370,290 B2
(45) Date of Patent: Jun. 28, 2022

(54) FRICTION CLUTCH FOR A MOTOR VEHICLE POWERTRAIN, POWERTRAIN UNIT, TRANSMISSION UNIT, AND POWERTRAIN

(71) Applicant: Schaeffler Technologies AG & Co. KG, Herzogenaurach (DE)

(72) Inventors: Marc Finkenzeller, Gengenbach (DE); Aurelie Keller, Herrlisheim (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/733,999

(22) PCT Filed: May 10, 2019

(86) PCT No.: PCT/DE2019/100426
§ 371 (c)(1),
(2) Date: Dec. 1, 2020

(87) PCT Pub. No.: WO2019/233513
PCT Pub. Date: Dec. 12, 2019

(65) Prior Publication Data
US 2021/0213823 A1  Jul. 15, 2021

(30) Foreign Application Priority Data

Jun. 4, 2018 (DE) .......................... 102018113223.9
Apr. 10, 2019 (DE) ...................... 10 2019 109 431.3

(51) Int. Cl.
*B60K 6/387* (2007.10)
*F16D 13/52* (2006.01)
(Continued)

(52) U.S. Cl.
CPC .............. *B60K 6/387* (2013.01); *B60K 6/405* (2013.01); *F16D 13/52* (2013.01); *F16D 23/14* (2013.01);
(Continued)

(58) Field of Classification Search
CPC ............. B60K 6/387; F16D 23/12–148; F16D 2023/126; F16D 25/10; F16D 23/142; F16D 13/54–56
See application file for complete search history.

(56) References Cited

U.S. PATENT DOCUMENTS 5,691,588 A * 11/1997 Lutz .................... F16D 13/76
310/92
8,863,926 B2 * 10/2014 Knowles ................ B60K 6/387
903/952

(Continued)

FOREIGN PATENT DOCUMENTS

DE         10033649 A1    2/2001
DE    102004009832 A1    9/2004
(Continued)

*Primary Examiner* — Ernesto A Suarez
*Assistant Examiner* — Lillian T Nguyen
(74) *Attorney, Agent, or Firm* — Kevin L. Parks

(57) ABSTRACT

A friction clutch includes a reference plane aligned perpendicular to a rotational axis, a first clutch component, and a second clutch component. The first clutch component has a first friction element, a first support part that receives the first friction element, a leaf spring unit including a leaf spring that rotationally fixes the second support part to the first support part. The second clutch component has a second friction element. The first friction element lies against the second friction element in a frictionally locking manner in a closed position, and is axially spaced from the second friction element in an open position. The leaf spring is designed and positioned relative to the reference plane in a set angle in the closed position such that an additional axial (Continued)

force is applied to the first friction element and the second friction element in a drive rotational direction of the first clutch component.

9 Claims, 11 Drawing Sheets

(51) Int. Cl.
    *F16D 23/14*     (2006.01)
    *B60K 6/405*     (2007.10)
    *B60K 6/48*     (2007.10)
    *B60K 6/52*     (2007.10)
    *F16D 23/12*     (2006.01)

(52) U.S. Cl.
    CPC ................ *B60K 6/48* (2013.01); *B60K 6/52* (2013.01); *B60K 2006/4808* (2013.01); *B60K 2006/4825* (2013.01); *B60Y 2200/92* (2013.01); *B60Y 2400/424* (2013.01); *F16D 2023/126* (2013.01)

(56) References Cited

U.S. PATENT DOCUMENTS

2008/0087517 A1* 4/2008 Mori ...................... F16D 25/10
                                                                                                   192/48.614
2017/0259662 A1     9/2017   Meixner

FOREIGN PATENT DOCUMENTS

| DE | 102012211487 A1 | | 1/2014 | |
|---|---|---|---|---|
| DE | 102014218878 B3 | | 2/2016 | |
| DE | 102015205574 A1 | | 9/2016 | |
| DE | 102015215153 A1 | * | 2/2017 | ............. F16D 21/06 |
| DE | 102015225421 A1 | | 6/2017 | |
| EP | 2971828 A1 | | 9/2014 | |
| WO | WO-2017028862 A2 | * | 2/2017 | ............. F16D 25/10 |

* cited by examiner

FRICTION CLUTCH FOR A MOTOR VEHICLE POWERTRAIN, POWERTRAIN UNIT, TRANSMISSION UNIT, AND POWERTRAIN

CROSS-REFERENCE TO RELATED APPLICATIONS

This application is the United States National Phase of PCT Appln. No. PCT/DE2019/100426 filed May 10, 2019, which claims priority to German Application Nos. DE102018113223.9 filed Jun. 4, 2018 and DE102019109431.3 filed Apr. 10, 2019, the entire disclosures of which are incorporated by reference herein.

TECHNICAL FIELD

The disclosure relates to a friction clutch for a powertrain of a motor vehicle, such as a car, truck, bus or other commercial vehicle. The disclosure additionally relates to a powertrain unit, having said friction clutch, to a transmission unit with a powertrain unit, and to a powertrain.

BACKGROUND

Automatic transmissions for motor vehicles are generally known from the prior art. Clutches are already known that can couple an output of the transmission, in addition to its coupling with the wheels of a front axle, selectively with wheels of a rear axle to implement an all-wheel drive.

However, it has turned out to be a disadvantage of the designs known from the prior art that these clutches must be designed to be relatively large for the transmission of high torques.

SUMMARY

The present disclosure provides a friction clutch which is designed to transmit higher torques and which is optimized with regard to the installation space required.

Accordingly, a friction clutch for a motor vehicle powertrain is realized. This friction clutch is provided with two clutch components each having at least one friction element. The friction elements of the various clutch components may be arranged alternately next to one another in an axial direction of a central rotational axis (of the friction clutch) and in a closed position (of the friction clutch) lie against each other in a frictionally locking manner and in an open position (of the friction clutch) are axially spaced from each other. A first clutch component additionally has a first support part, which receives at least one first friction element, and a second support part, which is rotationally fixed to the first support part by means of at least one leaf spring unit. A leaf spring of the at least one leaf spring unit is designed and positioned relative to a reference plane aligned perpendicularly to the rotational axis in a set angle in the closed position such that an additional axial force is applied to the friction elements of the different clutch components in a drive rotational direction of the first clutch component.

This self-intensifying design of the friction clutch enables high drive torques to be transmitted. At the same time, the number and the dimensions of the respective friction elements can be reduced. This results in both a saving in installation space and a reduction in the assembly cost. A so-called "corner energy" (engagement force times engagement travel) on the part of an actuation can also be kept small in order to use actuators (actuating units) that have a low energy consumption.

If the at least one leaf spring unit has a plurality of leaf springs arranged to form a leaf spring assembly, it is designed to generate a high axial force. The leaf springs of the leaf spring unit lie flat on top of one another in a typical manner and extend parallel to one another. Each leaf spring is fixed with a first end to the first support part and with a second end to the second support part.

If several leaf spring units are arranged distributed along a circumference/in a circumferential direction of the support parts, a uniform transmission of the axial force takes place.

If the at least one leaf spring unit is arranged radially inside the friction elements, a compact design of the friction clutch is made possible.

In addition, an actuating force introduction mechanism which has at least one lever element and/or a pressure pot and is operatively connected to an axial force actuator, e.g. in the form of a lever actuator, may be received on the second support part. As a result, the component responsible for introducing the axial force/actuating force can be received in a stable manner.

In this context, the actuating force introduction mechanism may have a pressing plate connected to the first support part and acting in a displaceable manner on the assembly of friction elements.

The disclosure also relates to a powertrain unit for a hybrid vehicle, having an input shaft, being prepared for rotationally fixed attachment to an output of a transmission, of a friction clutch according to at least one of the previously described embodiments used operatively between the input shaft and an output shaft. The powertrain unit may also have an electric machine and a separating clutch used operatively between a rotor of the electric machine and the input shaft.

The disclosure also relates to a transmission unit for a hybrid vehicle, having said powertrain unit and a transmission connected to the input shaft of the powertrain unit.

The disclosure further relates to a powertrain for a hybrid vehicle, having the transmission unit and a differential gear coupled in a rotationally fixed manner to an output shaft of the powertrain unit.

In other words, according to the disclosure, a hybrid transmission (transmission unit) is made available which has an (automatic) transmission and an electric machine which is axially offset therefrom and is arranged at an output of the transmission. The electric machine can be coupled to/decoupled from a powertrain using a separating clutch. In addition, a further (second) clutch can optionally be provided, which is designed for coupling/decoupling a drive shaft (output shaft) connected to a differential gear. The electric machine and the at least one clutch or the two clutches together form a module. Thereby, disk springs/leaf springs (of the further clutch) are provided with a set angle in a closed state (of the further clutch).

BRIEF DESCRIPTION OF THE DRAWINGS

The disclosure will now be explained in more detail with reference to figures, in which context various exemplary embodiments are also shown. In the figures.

DETAILED DESCRIPTION

The figures are only schematic in nature and serve only for understanding the disclosure. The same elements are provided with the same reference symbols. The different features of the various exemplary embodiments can also be freely combined with one another.

Figure 1:
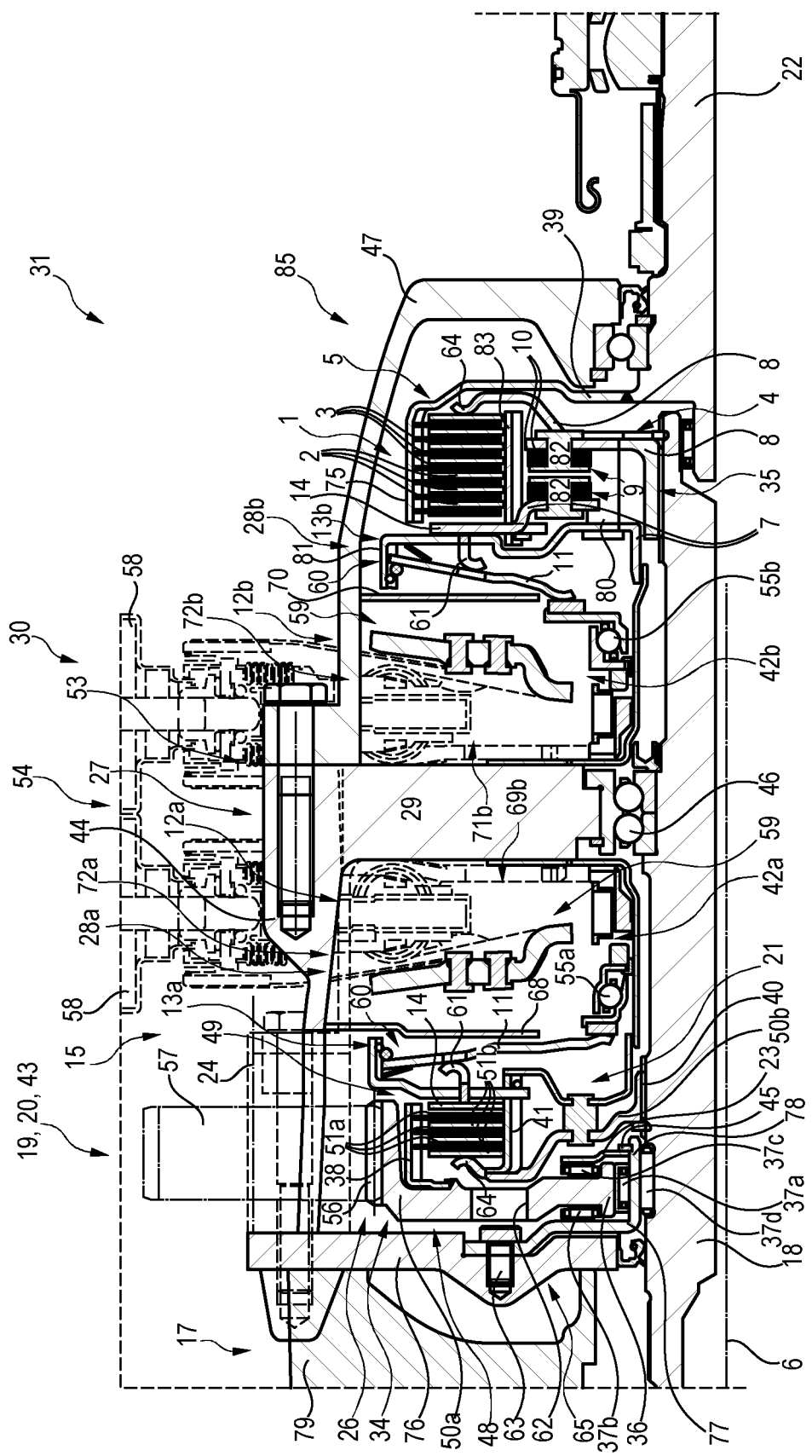
FIG. 1 shows a longitudinal sectional view of a powertrain unit according to the invention, integrated in a transmission unit, according to a first exemplary embodiment, wherein the powertrain unit has two different clutches and, for the sake of clarity, the view of an electric machine is omitted.

FIG. 1 shows a powertrain unit 15 according to the disclosure constructed according to a first exemplary embodiment. The powertrain unit 15 is already operatively connected to a transmission 17, which is only indicated with regard to its position in FIG. 1 and is further illustrated in FIG. 6. The powertrain unit 15 forms a transmission unit 30 with this transmission 17. The transmission 17 is implemented as an automatic transmission. An output (not shown, may be in the form of a transmission output shaft) of the transmission 17 is connected in a rotationally fixed manner to an input shaft 18 of the powertrain unit 15. The output may be connected in a rotationally fixed manner to the input shaft 18 via a toothing.

Figure 6:
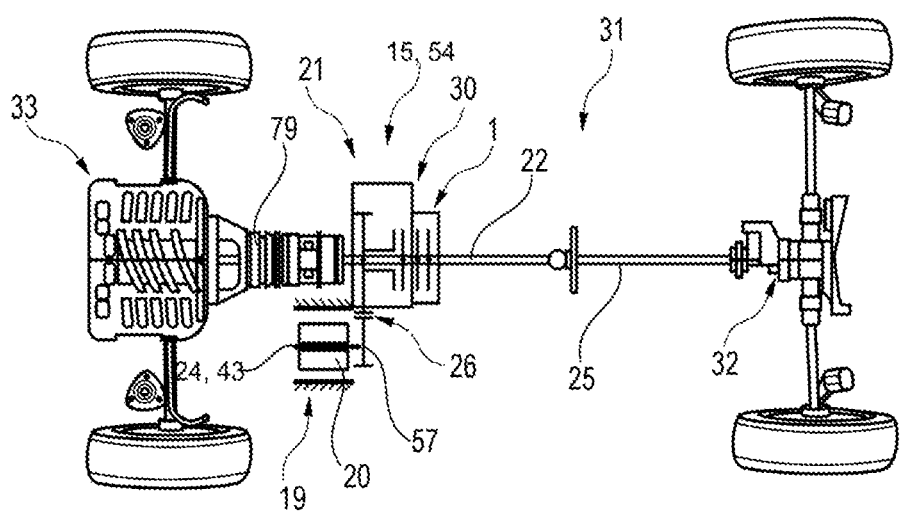
FIG. 6 shows a schematic view of a powertrain used in a motor vehicle, in which the powertrain unit according to FIG. 1 is used.

The transmission unit 30 may be used in a powertrain 31 of a hybrid all-wheel drive vehicle, as can be seen in FIG. 6. The transmission 17 is operatively connected on the input side in a typical manner to an internal combustion engine 33. The powertrain unit 15 is inserted between the transmission 17 and a Cardan shaft 25 which is further connected to a differential gear 32 on a rear axle of the motor vehicle. The Cardan shaft 25 is connected in a rotationally fixed manner to an output shaft 22 of the powertrain unit 15. The powertrain unit 15 has a clutch device 54 with two clutches 1, 21 and an electric machine 19, which is indicated in principle with regard to its position.

Returning to FIG. 1, it can also be seen that the powertrain unit 15 has a housing 27 which substantially forms two housing regions 28a, 28b separated from one another by a housing wall 29/partition wall. In a first housing region 28a of the housing 27, a first clutch 21, which is referred to below as a separating clutch 21, is housed radially outside the centrally arranged input shaft 18, the rotational axis/ longitudinal axis of which is provided with the reference sign 6. The separating clutch 21 is implemented as a friction plate clutch. The input shaft 18 is supported on a radial inside of the housing wall 29 by a supporting bearing 46, designed here as a double ball bearing/double-row groove ball bearing.

The separating clutch 21 is rotatably coupled with its first clutch component 48 to a rotor 20 of the electric machine 19. The first clutch component 48 has a plurality of first friction plates 51a, which are typically connected to a plurality of second friction plates 51b of a second clutch component 49 of the separating clutch 21 in a rotationally fixed manner (closed position) or are rotationally decoupled therefrom (open position) for the embodiment as a friction plate clutch. The first and second friction plates 51a, 51b are alternately arranged in the axial direction. The separating clutch 21 is moved back and forth between its closed position and its open position by a first actuating unit 42a. The friction plates 51a, 51b are to be understood as units having a friction lining on a supporting element either on one side or on both sides.

As explained in more detail below, the first actuating unit 42a is equipped with a (first) axial force actuator in the form of a first lever actuator 12a, which has an adjusting effect on a first actuating bearing 55a. The first actuating bearing 55a in turn serves to shift the first and second friction plates 51a, 51b. The first lever actuator 12a, and the second lever actuator 12b described below, are each implemented in a known manner. In this connection, reference is made by way of example to the release system of DE 10 2004 009 832 A1, the structure and function of which is considered to be integrated therein for the respective lever actuator 12a, 12b.

Accordingly, the respective lever actuator 12a, 12b has an electric motor 58 which, for example, interacts with a ramp element to adjust it via a spindle drive. The ramp element is axially adjustable by means of a pivot point which can be moved along its radial ramp contour and which can be adjusted by the spindle drive. Due to the axial coupling of the ramp element to the actuating bearing 55a, 55b, the respective actuating bearing 55a, 55b is displaced and the corresponding clutch is actuated.

In a further embodiment, the respective axial force actuator is alternatively implemented as a hinge actuator. In this connection, reference is made to DE 10 2012 211 487 A1, which describes such a hinge actuator, the design of which is considered to be integrated therein for the respective axial force actuator. Accordingly, in the further embodiment, the first axial force actuator is implemented as a first hinge actuator and/or the second axial force actuator is implemented as a second hinge actuator.

The first clutch component 48 also has a (first) support 50a which is rotatably mounted relative to the housing 27, namely to a bearing flange unit 65 connected to the housing 27 and forming the housing 27 therewith, which is referred to simply as the bearing flange 65 in the following. For this purpose, the first support 50a has a bearing base 36 on its radial inside, which is supported on the bearing flange 65 via a plurality of roller bearings 37a, 37b, 37c in the axial direction and in the radial direction. From this bearing base 36, the first support 50a extends radially outwards in a substantially disk-shaped manner with respect to the rotational axis 6. On a radial outer side, the first support 50a forms a toothing 56 (external toothing) which is coupled in a rotationally fixed manner to the rotor 20, as described in more detail below.

A (first) receiving region 38 projecting in the axial direction is provided radially inside the toothing 56 on the first support 50a, which first receiving region 38 serves directly to receive the first friction plates 51a in a rotationally fixed manner. The receiving region 38 is also part of the first clutch component 48. In addition, the first friction plates 51a are received on the first receiving region 38 such that they can be displaced relative to one another in the axial direction. The first friction plates 51a are arranged towards a radial inside of the first receiving region 38, so that the first support 50a forms an outer plate support of the separating clutch 21. The first support 50a extends in such a way that the first friction plates 51a are arranged in the radial direction outside the bearing base 36 and radially inside the toothing 56.

The second clutch component 49 is permanently coupled to the input shaft 18 in a rotationally fixed manner. For this purpose the second clutch component 49 has a (second) support 50b. The second support 50b is connected to the input shaft 18 via a serration 40 in a rotationally fixed manner. The second support 50b has a first sleeve region 41 which extends in the axial direction and to the radial outer side of which the second friction plates 51b are arranged in a rotationally fixed manner and displaceable relative to one another in the axial direction. The second support 50b thus forms an inner plate support of the separating clutch 21.

In this embodiment, the electric machine 19 with its rotor 20, which in turn can be rotated about a rotor rotational axis 24, is arranged radially outside the input shaft 18. A rotor shaft 43 (FIG. 6) of the rotor 20 is arranged radially offset, here substantially parallel to the rotational axis 6. To couple the rotor 20 to the first support 50a, a gear stage 26 is provided. A gearwheel 57, shown in dashed lines in FIG. 1, is permanently in meshing engagement with the toothing 56.

The gearwheel 57 is directly connected to the rotor shaft 43 (FIG. 6) in a rotationally fixed manner and is thus arranged coaxially to the rotor 20. If the separating clutch 21 is in an open position, it is possible to let the electric machine 19/the rotor 20 stand still. In a closed position of the separating clutch 21, the electric machine 19 can typically be operated. In further embodiments, instead of the gear stage 26, a coupling of the rotor 20 via a continuous traction mechanism, such as a belt or chain, is provided with the toothing 56 which is then correspondingly adapted to the continuous traction mechanism.

With regard to the bearing flange 65, which supports the first support 50a, it can also be seen that it is substantially implemented in two parts, wherein a one-part design according to further embodiments is also possible. A disk-shaped base body 76 of the bearing flange 65 is further connected to a main housing component 44 of the housing 27 that forms the housing wall 29. In this embodiment, the base body 76, like the main housing component 44, is made of an aluminum material (a cast aluminum material) and itself forms a crank.

A supporting element 77 of the bearing flange 65 is connected to the base body 76. The supporting element 77 is fastened to the base body 76 (in the region of its crank) via a plurality of fastening means 63, here screws, which are distributed in the circumferential direction. For easier attachment of the fastening means 63, axial through holes 62 are made in the first support 50a at the radial height of the fastening means 63. Each of these through holes 62 is axially aligned with fastening means 63 in an initial position/assembly position. The supporting element 77 may be made from a formed steel material. The supporting element 77 has a bearing region 78 which forms a crank.

The bearing region 78 constitutes an axial projection on which the first support 50a is supported radially from the outside. The first support 50a is mounted on the bearing region 78 via a first roller bearing 37a serving as a radial bearing. On a side of the first support 50a facing the base body 76 in the axial direction, a second roller bearing 37b is arranged between the supporting element 77 and the first support 50a, forming an axial bearing. A third roller bearing 37c, which also forms an axial bearing, is arranged on a side of the first support 50a axially facing away from the base body 76.

This third roller bearing 37c is arranged in the axial direction between the first support 50a and a shim 23 in the form of a shim disk, which is received on the supporting element 77 in an axially fixed manner. The shim 23 is fixed directly to the bearing region 78 by means of a retaining ring 45. The input shaft 18 is supported radially from the inside on the bearing region 78 via a fourth roller bearing 37d relative to the housing 27. With regard to the first to fourth roller bearings 37a to 37d, it should be pointed out that although these are implemented as needle bearings in this embodiment, they can also be implemented in other ways, for example as ball bearings, in other embodiments.

The housing wall 29 divides the housing 27 into the first housing region 28a and the second housing region 28b. The second housing region 28b is delimited by a secondary housing component 47 which forms an overhead cavity and which is fastened to the main housing component 44. A further, second clutch 1 is arranged in the second housing region 28b. The second clutch 1, referred to simply as a clutch in the following, is also implemented as a friction clutch, namely a friction plate clutch. In an example embodiment, as explained in more detail below, this clutch 1 is implemented as a self-intensifying clutch 1. A first clutch component 4 of the clutch 1 is connected to the input shaft 18 in a rotationally fixed manner. A second clutch component 5 of the clutch 1 is connected in a non-rotationally fixed manner to the output shaft 22, which output shaft 22, as already described, is further connected to the Cardan shaft 25.

The first clutch component 4 of the clutch 1 has a first support 35 (of the clutch 1) as well as a plurality of first friction elements 2 (of the clutch 1), which are axially displaceable relative to one another and received on the first support 35 in a rotationally fixed manner. The first friction elements 2 are implemented as friction plates. The first friction elements 2 alternate in the axial direction with second friction elements 3 of the second clutch component 5 of the clutch 1, which are also implemented as friction plates. The second friction elements 3 are in turn mounted on a second support 39 (of the clutch 1) in a rotationally fixed manner and axially displaceable relative to one another. The second support 39 is directly connected to the output shaft 22 (here via a weld). To adjust the clutch 1 between its open position and its closed position, a second actuating unit 42b is provided in the second housing region 28b.

The second actuating unit 42b is, as explained in more detail below, equipped with a (second) axial force actuator in the form of a second lever actuator 12b, which has an adjusting effect on a second actuating bearing 55b. The second actuating bearing 55b in turn serves to move the first and second friction elements 2, 3.

Figure 17:
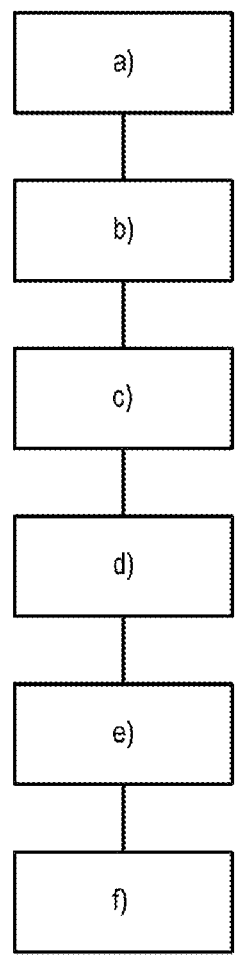
FIG. 17 shows a schematic view to illustrate an assembly method of the powertrain unit according to FIG. 1.

In connection with FIGS. 1 and 17, reference should also be made to an example method of assembling the powertrain unit 15 or the transmission unit 30. In a first step a), the bearing flange 65 is attached to the transmission housing, namely screwed to this transmission housing 79. In this first step a), the electric machine 19 is also attached to the transmission housing.

In a further second step b) a first module 34 is provided. The bearing flange 65 together with the first support 50a of the separating clutch 21 mounted thereon forms the common first module 34. The first support 50a is mounted together with the first to third roller bearings 37a, 37b, 37c on the supporting element 77 fastened to the base body 76. In addition, in the second step b), the rotor 20 of the electric machine 19 is connected to the first support 50a of the separating clutch 21 via the gear stage 26. The gear stage 26, i.e., the gearwheel 57 including its bearing and the electric machine 19 are already pre-assembled in step a). In addition, the axial play of the first support 50a of the separating clutch 21 is adjusted by means of the shim 23. It should be noted that, according to a further embodiment, the first module 34 is first installed separately (according to step b)) and then attached (according to step a)) to the transmission housing 79 by fastening the bearing flange 65.

In a third step c) the central input shaft 18 is supported via the supporting bearing 46 on the radially inwardly projecting housing wall 29. The supporting bearing 46 is consequently preloaded between the main housing component 44 and the input shaft 18. The supporting bearing 46 is thus firmly fixed between the housing 27 and the input shaft 18. In this third step c), the main housing component 44 is still spaced apart/disassembled from the bearing flange 65 and the other components of the housing 27. The input shaft 18 is also arranged separately from the separating clutch 21.

In a fourth step d), a first lever actuator 12a (first axial force actuator) of the first actuating unit 42a provided for actuating the separating clutch 21 is mounted in the main housing component 44, namely in the first housing region 28a. In this fourth step d), a second lever actuator 12b (second axial force actuator) provided for actuating the second clutch 1 is also mounted in the main housing component 44, namely in the second housing region 28b. This results in an assembly in which the second lever actuator 12b is mounted on an axial side of the housing wall 29 facing away from the first lever actuator 12a.

In a fifth step e), the second clutch component 49 of the separating clutch 21 is attached to the input shaft 18 in a rotationally fixed manner. A second module 53 is thus created.

Furthermore, the first clutch component 48 of the second clutch 1 is connected to the input shaft 18 in a rotationally fixed manner. This is may also be done in step e). To implement a third module 85, the secondary housing component 47 connected to part of the second clutch component 49 of the second clutch 1 is also provided. The third module 85 is fastened to the main housing component 44. The second clutch 1 with its two clutch components 48, 49 that can be coupled to one another fully assembled and the second lever actuator 12b is brought into operative connection with this second clutch 1. With the second clutch component 49 of the second clutch 1, the output shaft 22 is already connected in a rotationally fixed manner in this step.

In a sixth step f), a second module 53 provided by steps c) to e) is connected as a whole to the first module 34 so that the main housing component 44 is connected to the bearing flange 65. The separating clutch 21, with its two clutch components 48, 49 that can be coupled to one another, is fully assembled, and the first lever actuator 12a is brought into operative connection with the separating clutch 21. Finally, the powertrain unit 15 is mounted on the transmission housing 79. The individual method steps a) to f) may be carried out one after the other in alphabetical order. After step f), the third module 85 may then be attached to the second module 53.

In this connection, it should be pointed out that the various modules 22, 53, 85 can be mounted independently of one another in any order. It is also possible to provide only two of the three modules 22, 53, 85 and connect them to one another.

Figure 3:
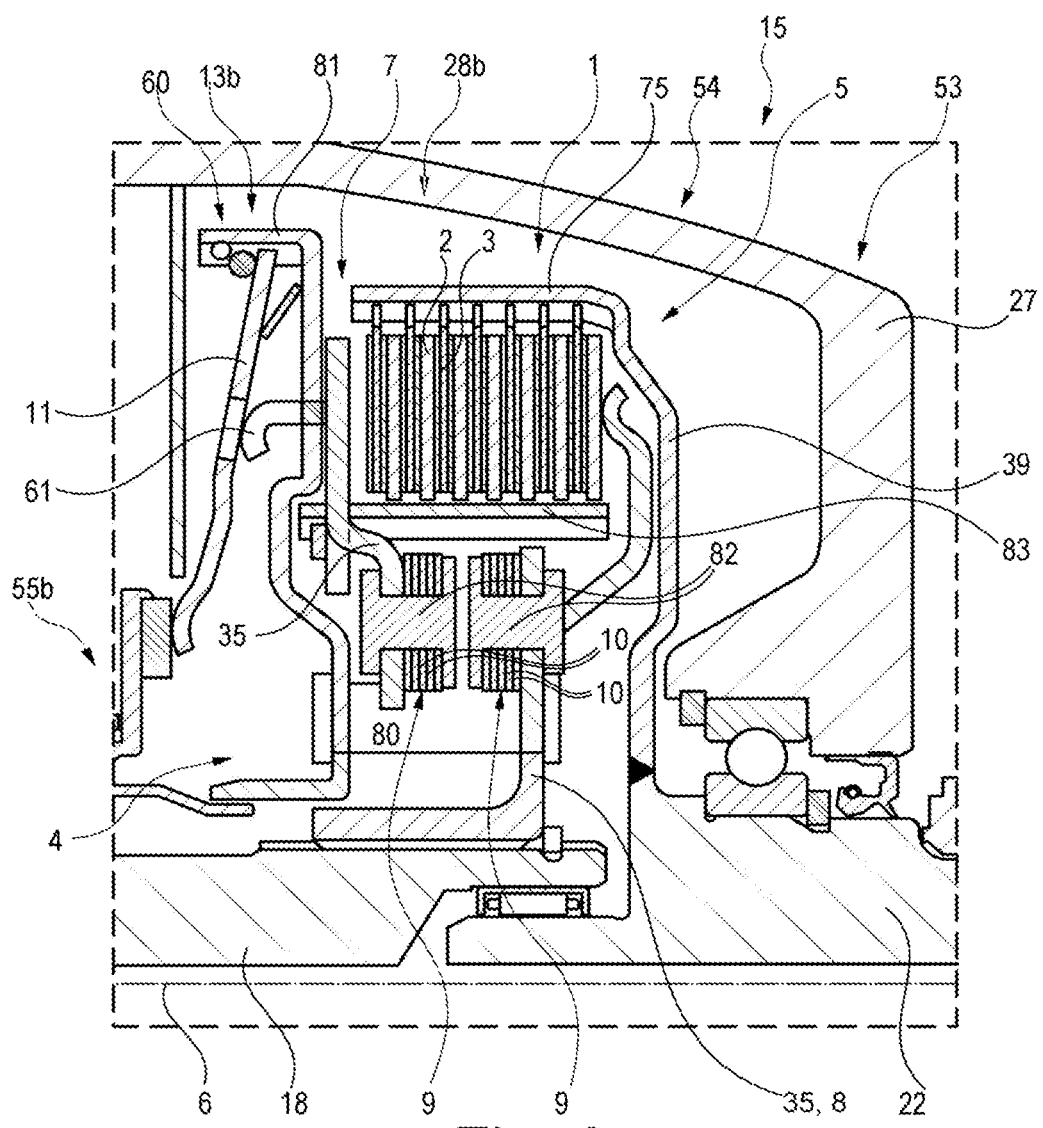
FIG. 3 shows a detailed longitudinal sectional view of the powertrain unit according to FIG. 1 in the region of a self-intensifying, further clutch provided in addition to the separating clutch.
Figure 4:
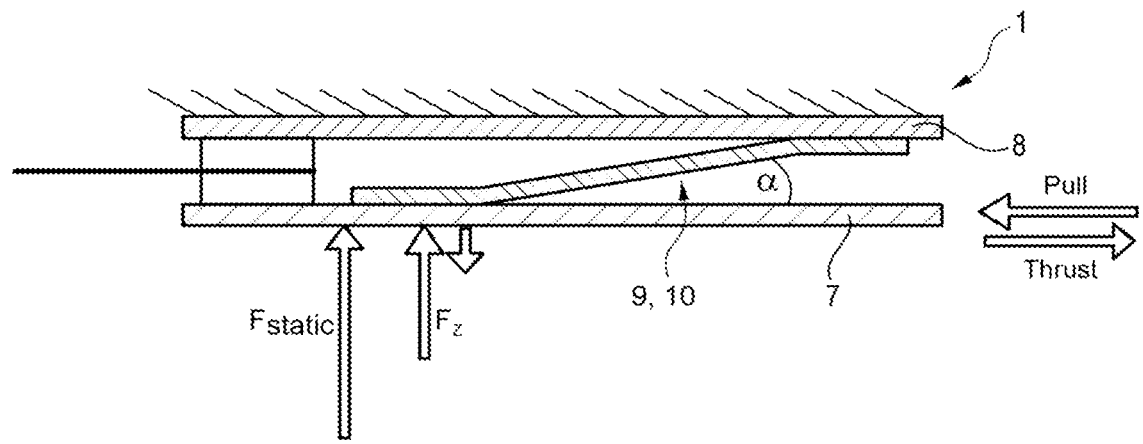
FIG. 4 shows a schematic view of a peripheral region of the further clutch according to FIG. 3, in which region a leaf spring unit can be seen which has a certain set angle in the closed state of the further clutch.
Figure 5:
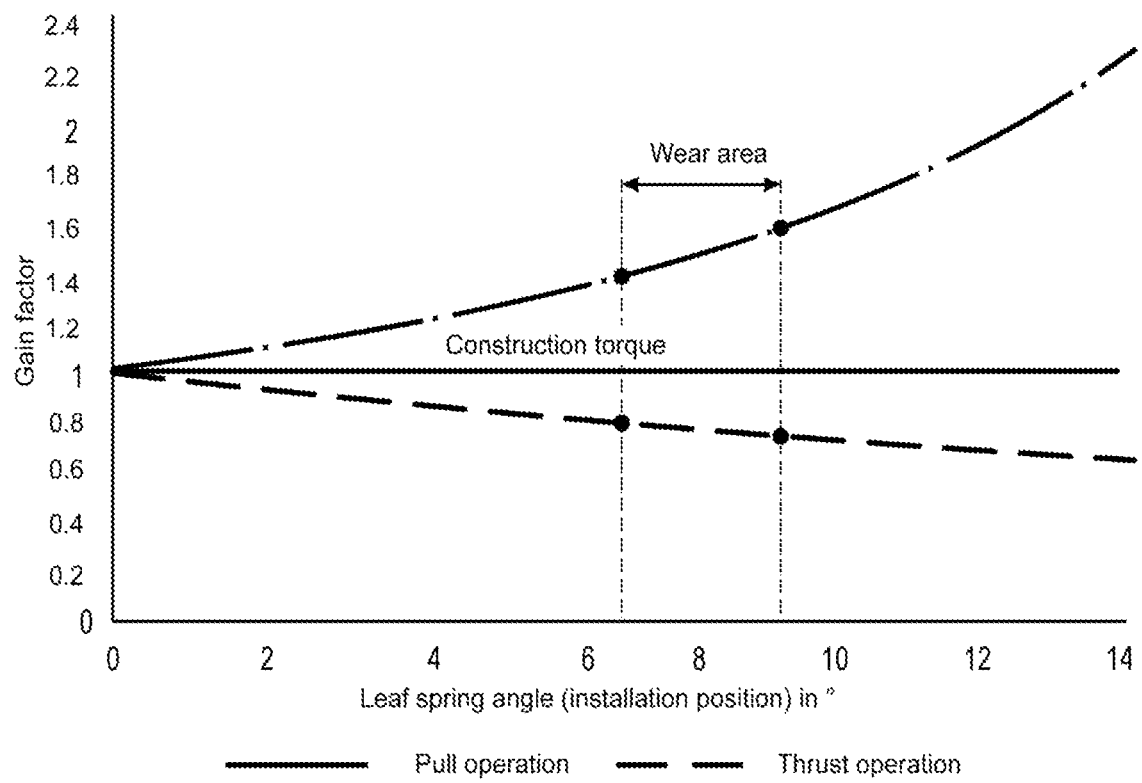
FIG. 5 shows a diagram to illustrate a relationship between a gain factor and the set angle of the leaf springs of the leaf spring unit (leaf spring angle) of the further clutch according to FIG. 3.
Figure 7:
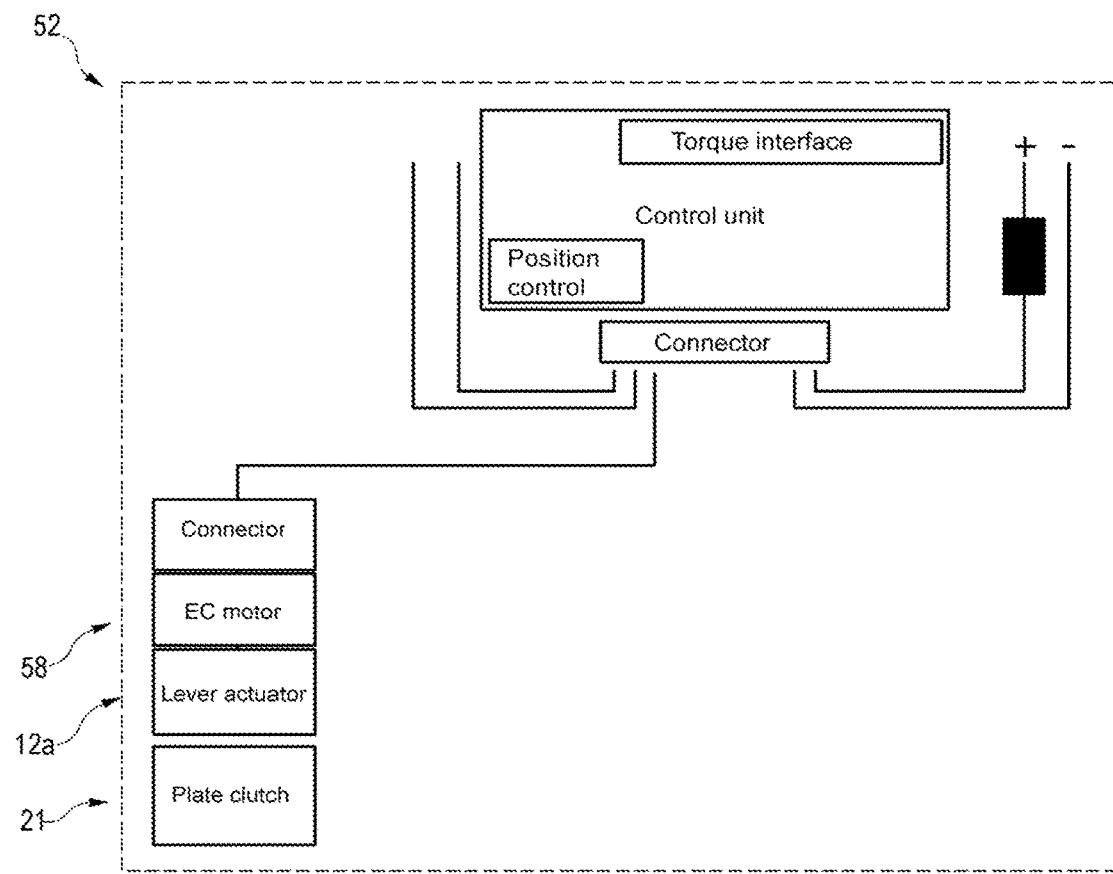
FIG. 7 shows a schematic view of a control system that can be used to control the separating clutch.
Figure 8:
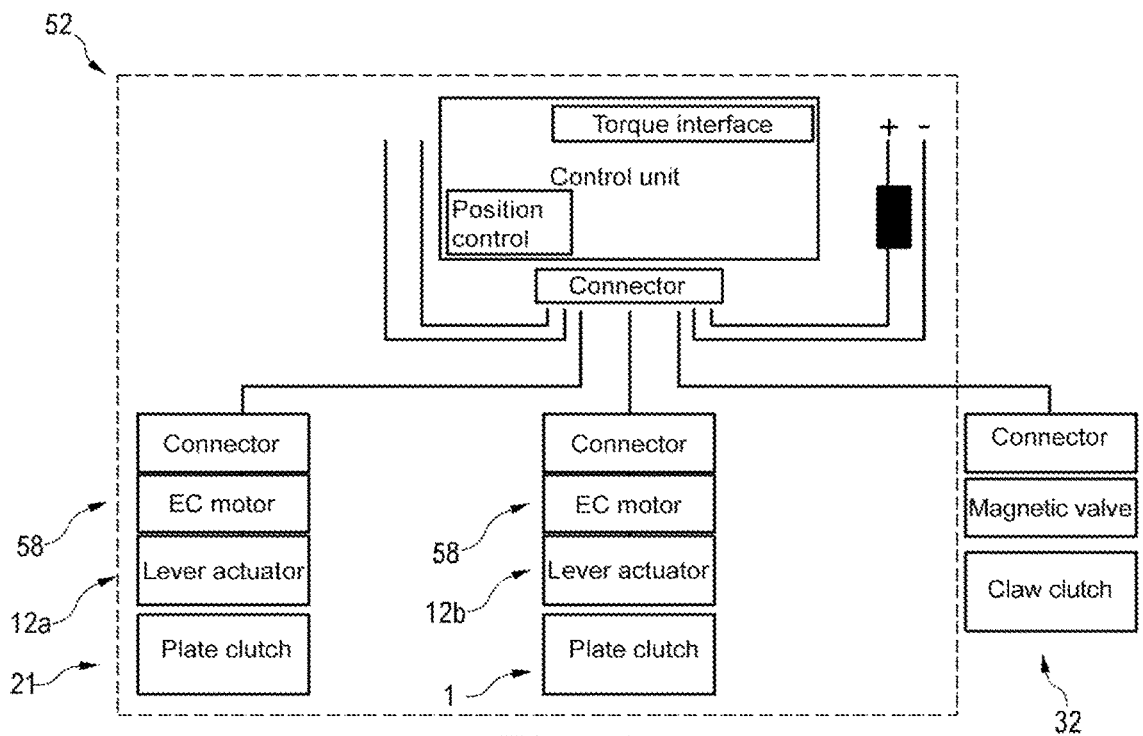
FIG. 8 shows a schematic view of a control system that can be used to control the two clutches of the powertrain unit according to FIG. 1.
Figure 9:
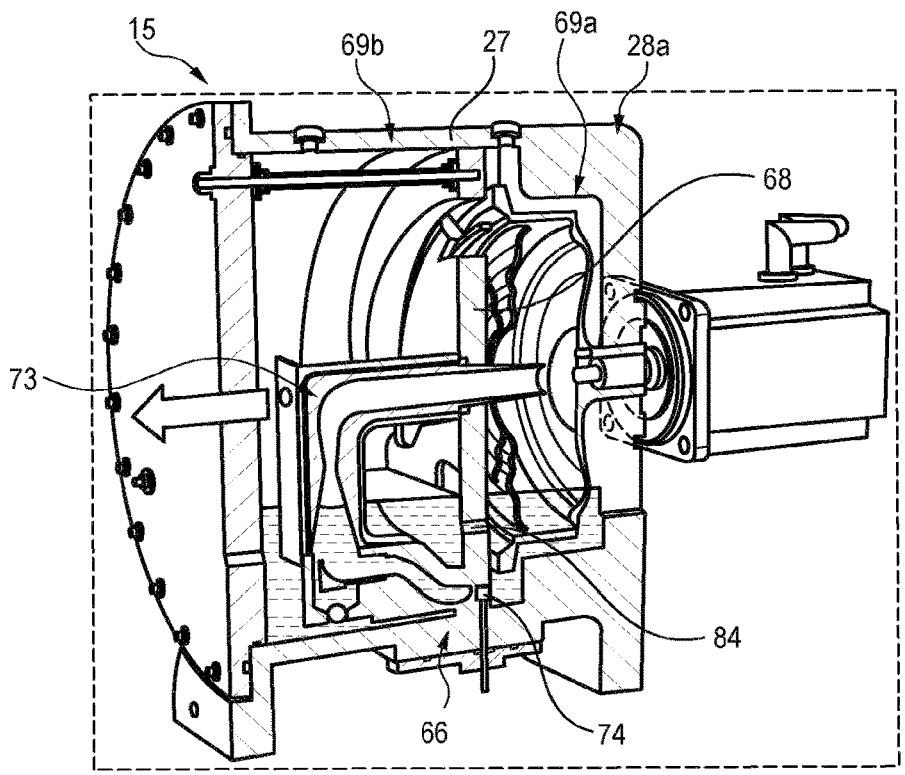
FIG. 9 shows a perspective longitudinal sectional view of a powertrain unit according to the invention according to a further third exemplary embodiment in a standing state, wherein the powertrain unit is implemented while running wet and has a coolant delivery device.

FIGS. 3 to 5 further describe the self-intensifying structure of the second clutch 1, which is described in detail below. FIGS. 7 and 8 also illustrate control systems 52 which can be implemented in principle and which are designed to control the powertrain unit 15. FIG. 7 shows the control system 52 only on the side of a region that interacts with the separating clutch 21. In FIG. 8, the entire control system 52 is also shown with a region, which control system controls the second clutch 1 and the differential gear 32 designed as a rear axle gear.

Figure 2:
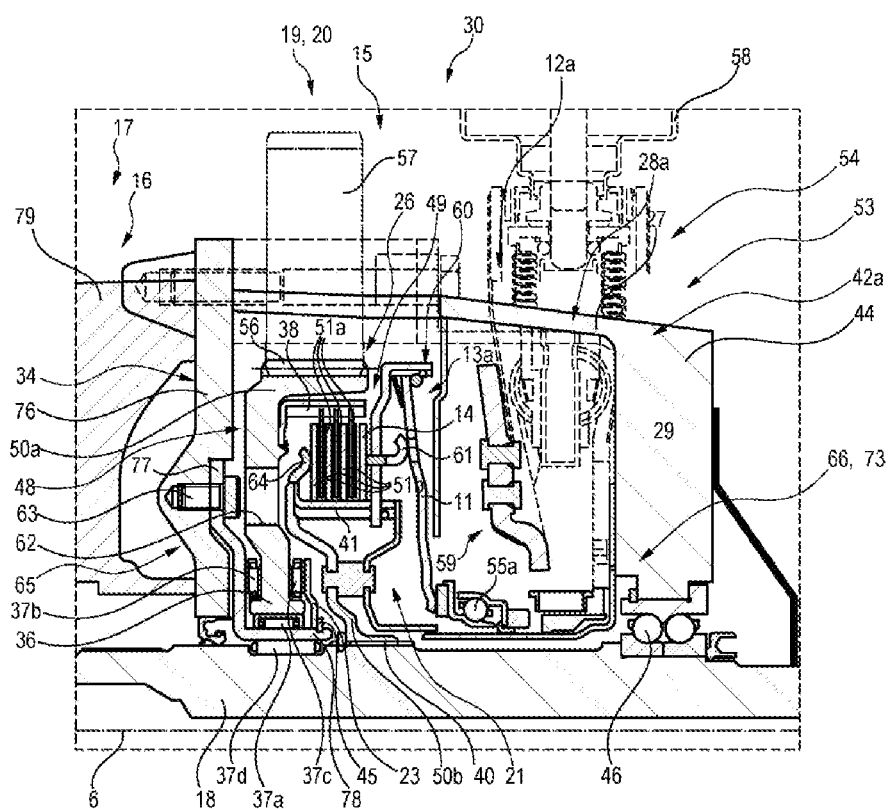
FIG. 2 shows a longitudinal sectional view of a powertrain unit according to the invention, designed for a front-wheel drive of a motor vehicle, according to a second exemplary embodiment, wherein the powertrain unit is provided with only one single separating clutch.

In connection with FIG. 2, a second exemplary embodiment of the powertrain unit 15 is illustrated. This second exemplary embodiment corresponds in structure and function to the first exemplary embodiment. The powertrain unit 15 of this second exemplary embodiment is implemented like the first exemplary embodiment with regard to the first housing region 28a and the components accommodated by this first housing region 28a. In this connection, it should be pointed out that, in principle, the optional second clutch 1 is dispensed with in order to provide a hybrid transmission unit 30, e.g., purely for front-wheel drive. In this embodiment, the powertrain unit 15 therefore only has the function of coupling and uncoupling the electric machine 19 from the front wheels of the motor vehicle. The assembly takes place according to the method described above, wherein the partial steps relating to the second clutch 1 are omitted.

With regard to a further aspect of the disclosure, let us return to FIG. 1. As can be seen in FIG. 1, both the first clutch 21 and the second clutch 1 have an actuating unit 42a, 42b assigned thereto. The first actuating unit 42a acting on the first clutch 21 is accommodated together with the first clutch 21 in the first housing region 28a. The first actuating unit 42a and the first clutch 21 are arranged on a first axial side of the central housing wall 29. The second clutch 1 and the second actuating unit 42b acting on it are arranged on a second axial side of the housing wall 29 facing away from this first axial side. It should be pointed out that the two actuating units 42a, 42b are in principle arranged in a mirror-inverted manner to the housing wall 29, but are essentially constructed in the same way and function in the same way. The function of the two actuating units 42a, 42b is thus described below using the first actuating unit 42a as an example, wherein this function is also applicable to the second actuating unit 42b.

The first actuating unit 11a has the first lever actuator 12a, which is partially shown in FIG. 1. As already mentioned, the first lever actuator 12a is constructed according to the release system of DE 10 2004 009 832 A1. It can also be seen that the first actuating bearing 55a, which is implemented here as a ball bearing, also acts on a first actuating force introduction mechanism 13a, which is also received on the first support 50a of the first clutch 21 and acts in an adjusting manner on the friction plates 51a, 51b. In this way, an actuating force/axial force can be applied to the entirety of friction plates 51a. 51b in the axial direction and the first clutch 21 can be brought into its closed position.

To support the actuating force, the first actuating force introduction mechanism 13a is received directly on the first support 50a. First support 50a is directly connected to the input shaft 18 in such a way that the actuating force is introduced directly into the input shaft 18 via the first support 50a, and from there is transmitted via the central supporting bearing 46 to the housing wall 29.

The first actuating force introduction mechanism 13a has a lever element 11, which is identified by the reference sign 33. The lever element 11 is implemented, for example, as a plate spring. The lever element 11 is pivotably received on a pivot bearing 60 which is fixedly connected to the first support 50a. Radially within the pivot bearing 60, the lever element 11 acts in an adjusting manner on an actuating member 61 which forms a pressure pot and which in turn acts directly in a shifting manner on the entirety of the friction plates 51a, 51b.

Alternatively, the first actuating force introduction mechanism 13a can also be implemented only with the actuating member 61 and consequently the first actuating bearing 55a can act directly on the actuator 61 in an adjusting manner. On a side of the set of friction plates 51a, 51b axially facing away from the actuating member 61, a counter supporting region 64 is arranged which counter supporting region 64 is also directly connected to the first support 50a in order to achieve a closed force curve in the first support 50a and the actuating force to be introduced into the input shaft 18 via the first support 50a.

As already mentioned, the second actuating unit 42b is constructed and functioning in accordance with the first operating unit 42a. Accordingly, the second actuating unit 42b in turn serves to apply force to the entirety of the friction elements 2, 3 of the second clutch 1 by means of a second actuating force introduction mechanism 13b. It can be seen here that, due to the self-intensifying design of the second clutch 1, a first support part 7 of the first support 35 of the second clutch 1, which accommodates the second actuating force introduction mechanism 13b, is coupled to a second support part 8 attached directly to the input shaft 18 via several leaf spring units 9 consisting of a plurality of leaf springs 10. The counter supporting region 64 of the second clutch 1 is coupled directly to the second support part 8.

Another aspect of the disclosure is illustrated in FIGS. 9 to 16. FIGS. 9 to 16 illustrate two further exemplary embodiments of the powertrain unit 15, which exemplary embodiments, however, are in principle constructed and function according to the first and second exemplary embodiments. For the sake of brevity, only the differences between these exemplary embodiments are explained below.

The powertrain unit 15 according to FIGS. 9 to 14 is substantially constructed according to the second exemplary embodiment in FIG. 2. The powertrain unit 15 of the third exemplary embodiment now additionally has a coolant delivery device 66, which is illustrated in its basic structure. The coolant delivery device 66 is shown in the fourth exemplary embodiment of FIGS. 15 and 16 just once for the two clutches 1, 21, since the coolant delivery devices 66 function identically. The function and structure of the coolant delivery devices 66 of FIGS. 15 and 16 are thus explained below on the coolant delivery device 66 of FIGS. 9 to 14.

The coolant delivery device 66 has a jet pump 73 which can be readily seen in FIGS. 9 to 14, and is arranged in part in a hydraulic fluid sump which is located in the installation position in a lower half of the housing 27. The coolant delivery device 66 is designed as a whole in such a way that it generates or supports a first coolant circuit 67a by means of the jet pump 73 when the input shaft 18 rotates in the first housing region 28a. The first housing region. 28a which accommodates the separating clutch 21 and the first actuating unit 42a, is acted upon by the first coolant circuit 67a during operation. A first bulkhead element 68 protrudes into the first housing region 28a in such a way that it divides it into two subspaces 69a, 69b. The first bulkhead element 68, which is implemented as a bulkhead plate, generates a flow through the hydraulic medium accommodated in a second subspace 69b accommodating the first actuating unit 42a. The first coolant circuit 67a is consequently directed to a first subspace 69a which receives the separating clutch 21.

Figure 10:
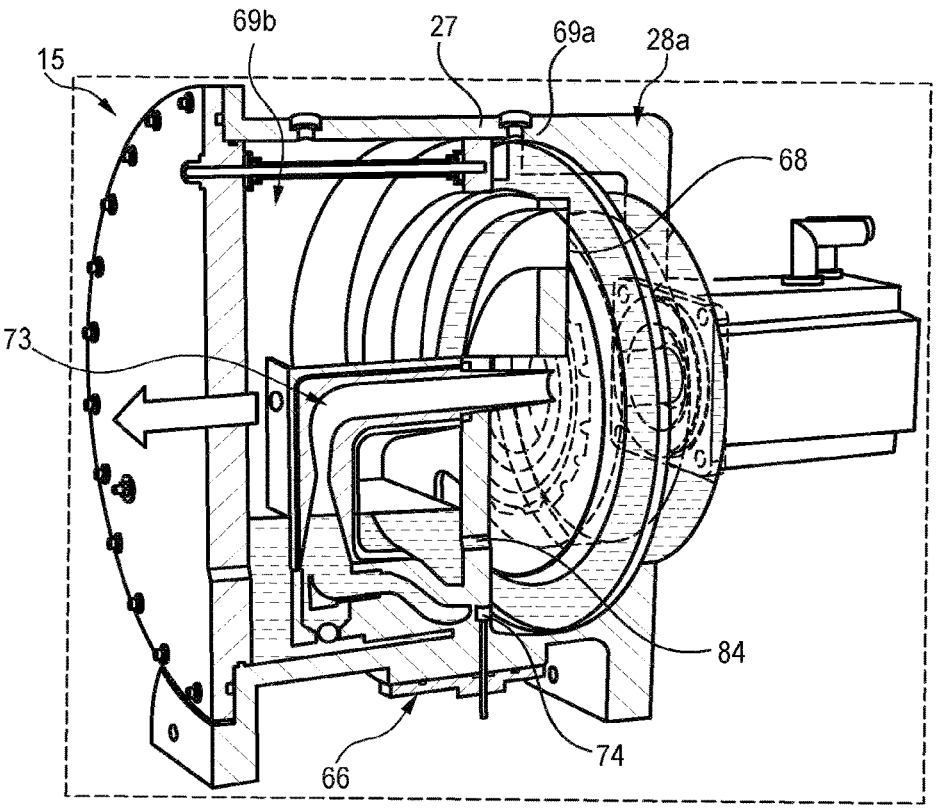
FIG. 10 shows a perspective longitudinal sectional view of the powertrain unit according to FIG. 9, wherein the input shaft is now moved at a certain speed so that a certain amount of coolant is already in the rotating region of the powertrain unit.
Figure 11:
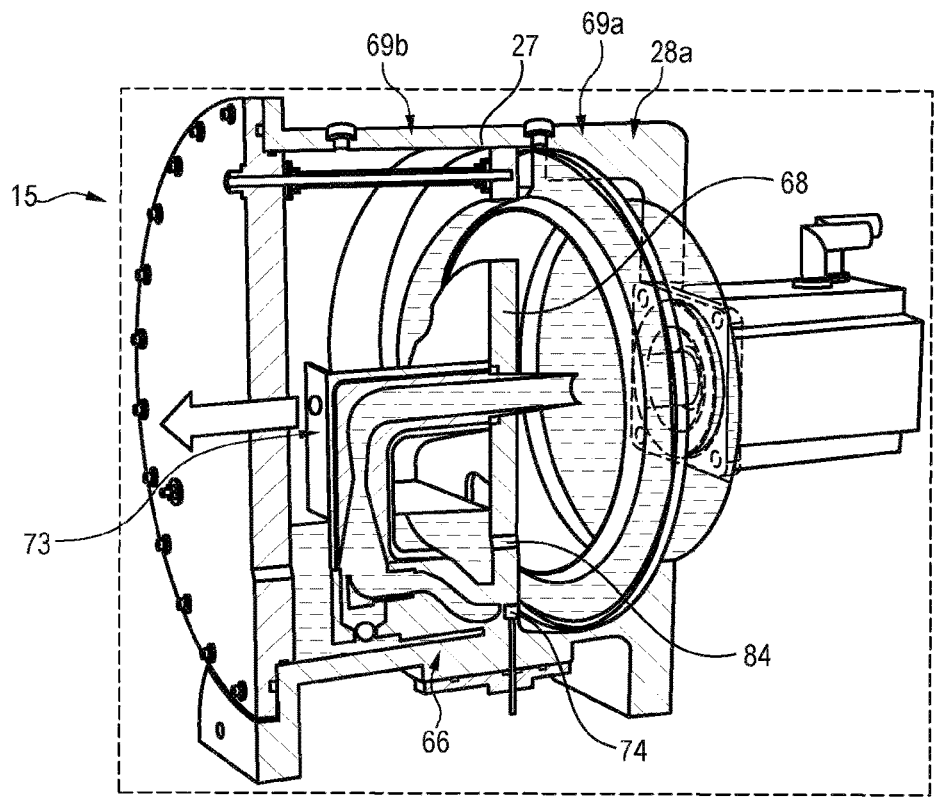
FIG. 11 shows a perspective longitudinal sectional view of the powertrain unit according to FIG. 9, wherein a plate for diverting the hydraulic medium is now slightly opened so that a higher proportion of coolant compared to FIG. 10 is built up in the rotating part of the powertrain unit.
Figure 12:
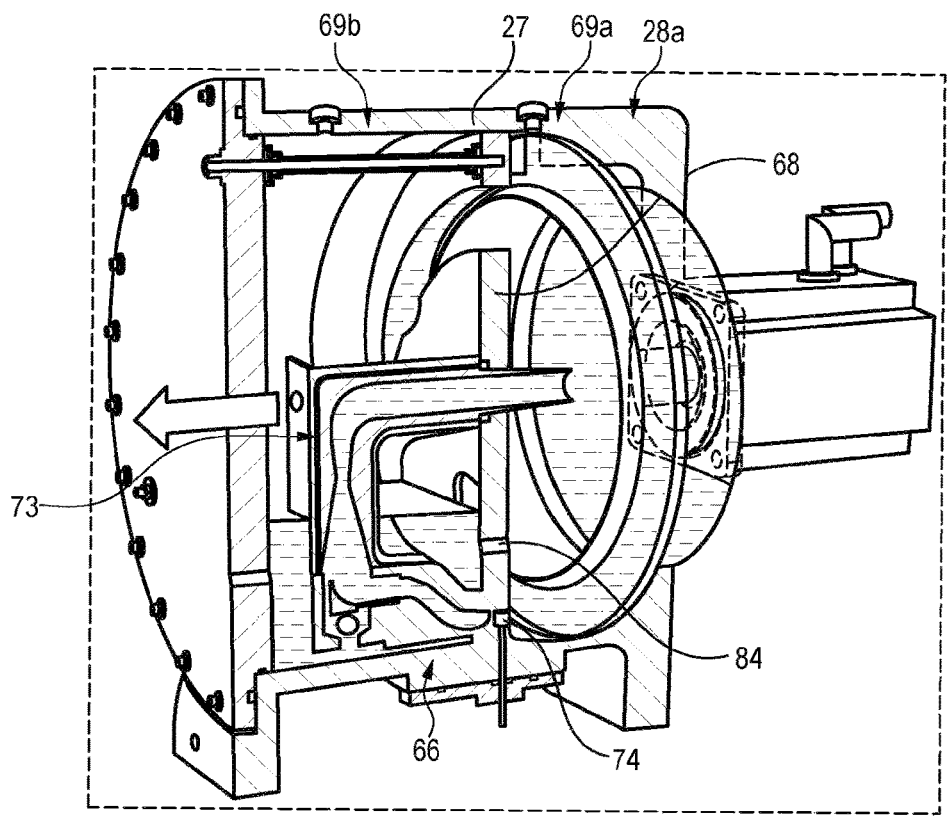
FIG. 12 shows a perspective longitudinal sectional view of the powertrain unit according to FIG. 9 with a completely open flap, so that further hydraulic medium compared to FIG. 11 is conveyed into the rotating part of the powertrain unit.
Figure 13:
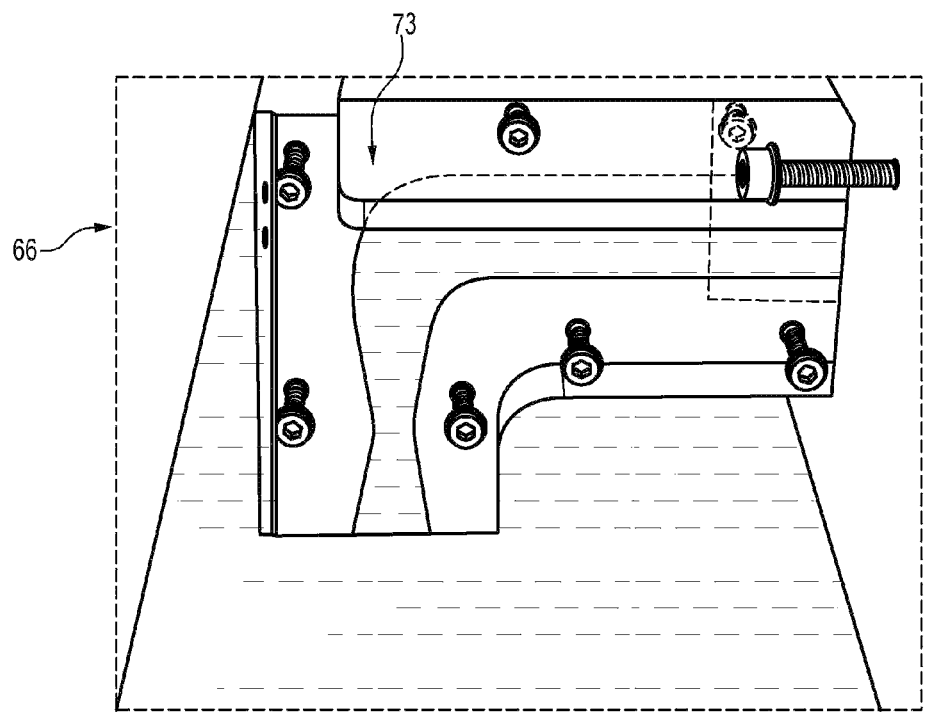
FIG. 13 shows a perspective view of a longitudinal cut-away of the jet pump used in the coolant delivery device of FIGS. 9 to 12, wherein the hydraulic medium has a minimum level.
Figure 14:
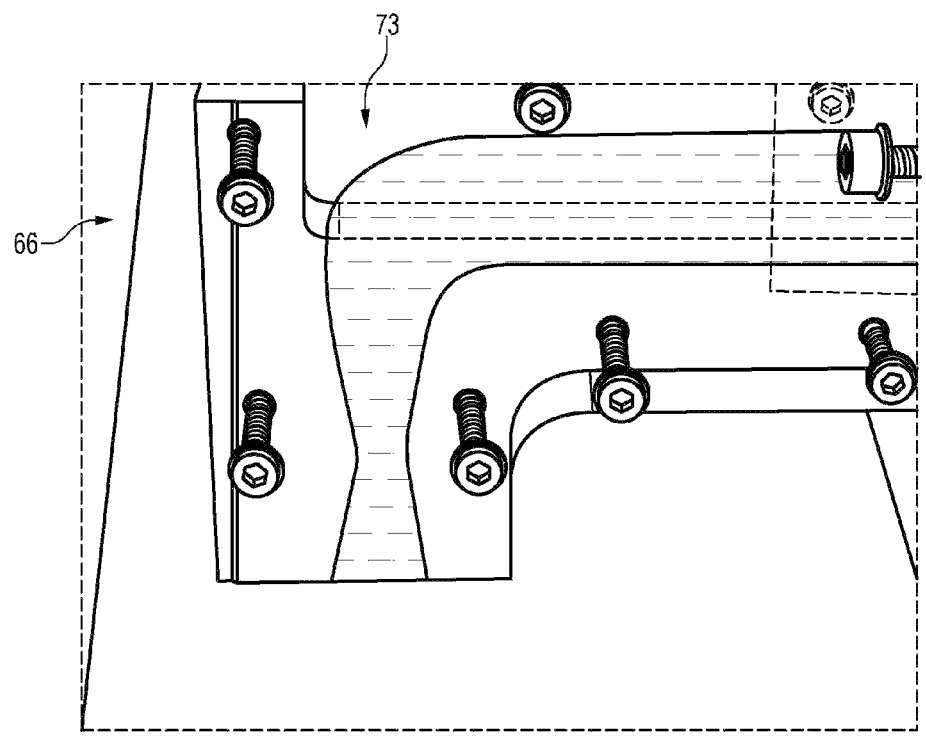
FIG. 14 shows a perspective view of a longitudinal cut-away of the region of the jet pump of FIG. 13, wherein a maximum level for conveying the hydraulic medium is now achieved.

Furthermore, as shown in FIGS. 10 to 12, a valve element 74 is additionally arranged in the coolant delivery device 66, which allows a flow regulation of the coolant in the first coolant circuit 67a with the input shaft 18 rotating.

Figure 15:
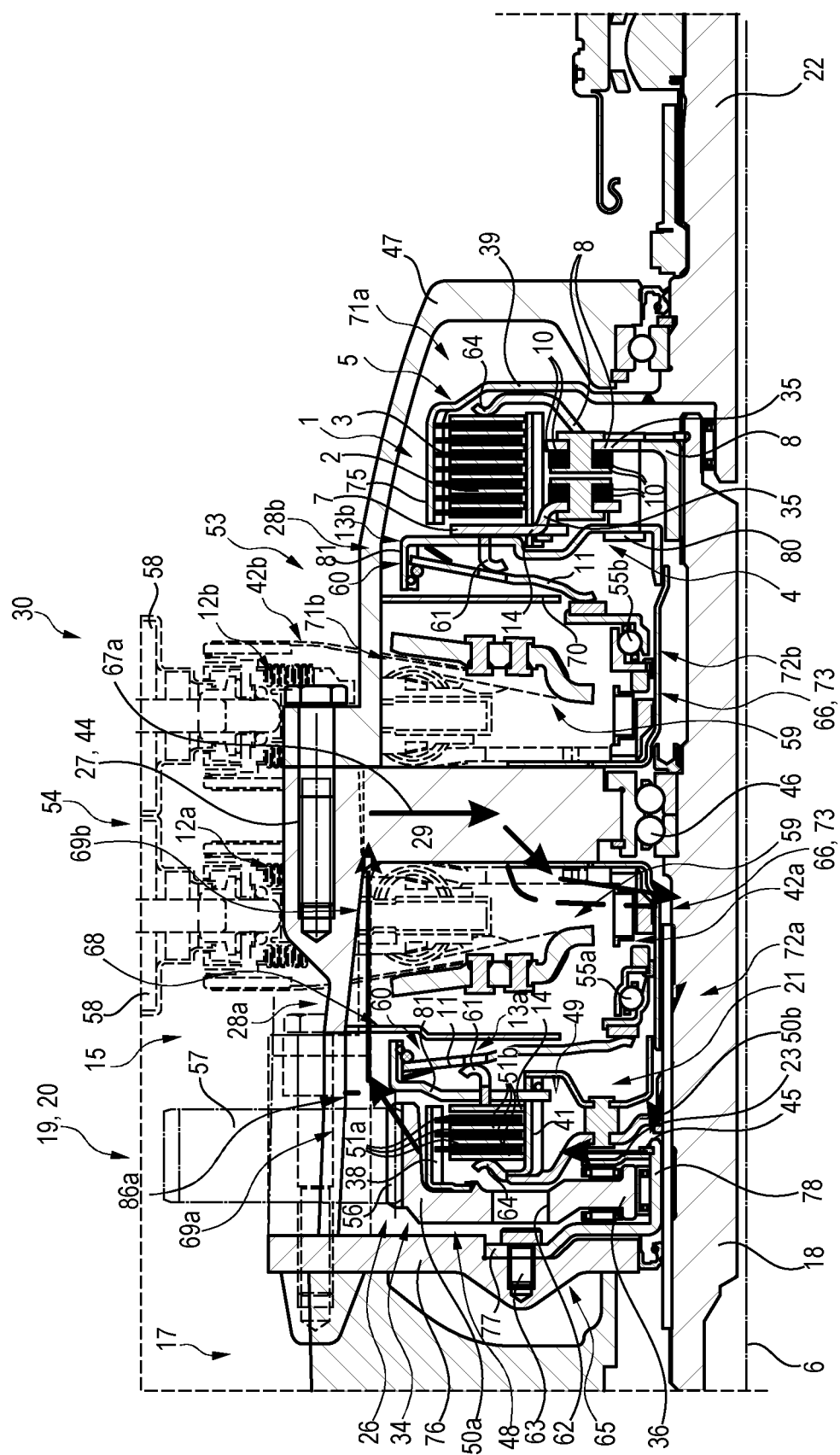
FIG. 15 shows a longitudinal cut-away view of a powertrain unit according to the invention according to a fourth exemplary embodiment, wherein a coolant delivery device is also provided and a hydraulic medium flow built up by the separating clutch is shown.
Figure 16:
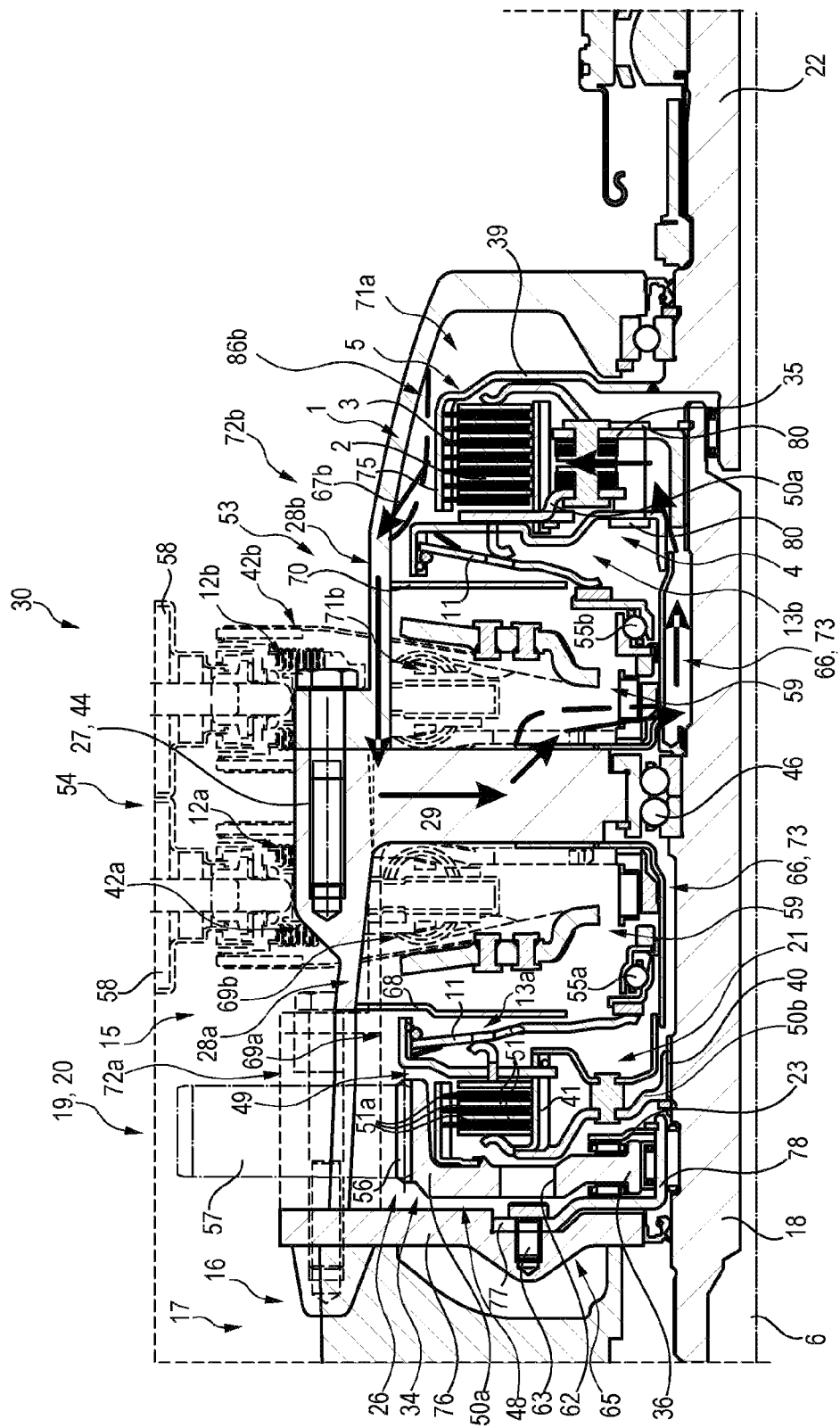
FIG. 16 shows a longitudinal cut-away view of the powertrain unit according to FIG. 15, wherein a hydraulic medium flow built up by the further clutch during operation is now marked.

The coolant delivery devices 66 of FIGS. 15 and 16 are designed as a whole in such a way that they each generate a coolant circuit 67a, 67b both in the first housing region 28a and in the second housing region 28b with the input shaft 18 rotating and thus the clutches 1, 21 rotating. The jet pump(s) 73 is/are at least partially integrated on the housing wall 29.

As likewise shown in FIGS. 15 and 16, the respective coolant delivery device 66 has a schematically illustrated discharge element 86a, 86b. The discharge element 86a, 86b is designed in such a way that it enables the coolant flowing in the circumferential direction to be deflected into a channel in the radially inward direction. The discharge element 86a has, for example, a blade contour. The channel is implemented, for example, by a bore and initially runs axially to the housing wall 29 and from there inward in the radial direction to the input shaft 18. A first discharge element 86a is accommodated in the first subspace 69a.

The second housing region 28b is divided in the same way as the first housing region 28a. For this purpose, a second bulkhead element 70 (also designed as a bulkhead plate) is provided, which divides the second housing region 28b into two subspaces 71a, 71b. According to FIG. 16, this also enables a fluid flow from a second subspace 71b, which accommodates the second actuating unit 11b, into a first subspace 71a. The second coolant circuit 67b arises in the first subspace 71a, which flows around the friction elements 2, 3 of the second clutch 1 in the radial direction and thus cools during operation. A valve element 74, which enables the flow of the coolant in the coolant circuits 67a, 67b to be regulated, is arranged for each clutch 1, 21. A second discharge element 86b is accommodated in the first subspace 71a.

As a result, a total of two independently controllable hydraulic subsystems 72a, 72b, each with a coolant delivery device 66 or, alternatively, a coolant delivery device 66 are made available, each of which makes the corresponding coolant circuit 67a, 67b controllable by the respective clutch 1, 21. This allows effective cooling of the respective clutch 1, 21.

According to the present aspect of the disclosure, as shown in FIGS. 1 and 3 and in connection with FIGS. 4 and 5, the second clutch 1 implemented as a friction clutch, which in further embodiments is also to be regarded as a unit detached from the first clutch 21 and the electric machine 19, is implemented as a self-intensifying clutch. This second clutch 1 according to the disclosure has the first clutch component 4 equipped with the two-part (first) support 35. The first support part 7 of this first support 35 is that component which directly receives the plurality of first friction elements 2 in a rotationally fixed manner and axial displacement relative to one another.

For this purpose, the first support part 7 typically has a sleeve-shaped (second) receiving region 83, on the radial outside of which the first friction elements 2 are attached. The first support part 7 also has a pressing plate 14 which is displaceable in the axial direction and which has an adjusting effect at the end on the ensemble of the friction elements 2, 3 of the second clutch 1. The pressing plate 14 is formed here by a plate element which is received separately on the second receiving region 83, but in further embodiments can in principle also be formed as one of the friction elements 2, 3.

The second support part 8 is connected to the first support part 7, which second support part 8 is that part of the first support 35 which is attached directly (by means of a serration) to the input shaft 18. The second support part 8 forms a counter supporting region 64 on an axial side of the ensemble of friction elements 2, 3 facing away from the pressing plate 14. The counter supporting region 64 serves to directly support an axial force/actuating force which compresses the friction elements 2, 3 in a closed position of the second clutch 1. In the closed position, the actuating force is typically introduced via the second actuating force introduction mechanism 3b to the entirety of the friction elements 2, 3 (via the pressing plate 14).

The second actuating force introduction mechanism 13b is fixed to the second support part 8. A plurality of stud bolts 80 distributed in the circumferential direction are used to fix a bearing section 81 of the second actuating force introduction mechanism 13b formed from a separate sheet metal to the second support part 8 or to design it as a component of this second support part 8. The lever element 11 is pivotably mounted on the bearing section 81. The lever element 11 is implemented, for example, as a plate spring. A second actuating bearing 55b acts on the lever element 11 and, in turn, the second lever actuator 12b of the second actuating unit 42b acts on this second actuating bearing 55b.

A plurality of leaf spring units 9 are provided distributed between the two support parts 7, 8 along a circumference of an imaginary circular line running around the central rotational axis 6. Each leaf spring unit 9 has a plurality of leaf springs 10, here five by way of example, which are arranged to form a leaf spring assembly. Accordingly, the leaf springs 10 within a leaf spring unit 9 are formed essentially identically and lie flat on one another. Each leaf spring 10 of the leaf spring unit 9, as can be seen particularly well in connection with FIG. 4, is provided with a set angle $\alpha$.

The set angle $\alpha$ is selected so that, in the closed position of the second clutch 1, a torque transmitted by the clutch 1 in a drive rotational direction (pull) increases the axial force/actuating force of the second clutch 1 in a self-intensifying manner. Accordingly, the force $F_z$ is also applied in order to increase the existing axial actuating force F. In the case of a drive rotational direction (thrust) opposite to this drive direction of rotation, however, the axial force is reduced by a corresponding amount. As can also be seen in connection with FIG. 5, the gain factor increases in principle with an increasing set angle $\alpha$ of the respective leaf spring 10. It becomes clear here that the set angle $\alpha$ may be selected between 6° and 10°, e.g., between 6.5° and 9.5°. This represents a suitable compromise between an increase in the axial force and a stability of the leaf springs 10.

In FIG. 3, two of the leaf spring units 9 can be seen in section. A first leaf spring unit 9 on the side of its first end is fixed to the first support part 7 (via a rivet 82), and a second leaf spring unit 9 on the side of its second end is fixed to the second support part 8 (via a rivet 82).

The second support 39 also has a second sleeve region 75, on the radial inside of which the plurality of second friction plates 51b are received in a rotationally fixed manner and are axially displaceable relative to one another.

In other words, according to the disclosure, an automatic transmission 30 is provided with a P3 electric machine 19 arranged at the transmission output, which can be connected and disconnected by means of a separating clutch 21 and optionally an all-wheel clutch 1 (so-called Quattro clutch) for connecting and disconnecting the Cardan shaft 25 leading to the distribution gear 32. The system thus consists of a hybridization of the transmission 17, which can implement the classic hybrid functions (electric driving, braking and thrust energy recovery, sailing, boost), consisting of an electric machine 19 with a separating clutch 21 and an all-wheel drive clutch 1 which can shift the Cardan shaft 25 if required. The system is arranged in a modular way so that the hybridization can be installed in both front-wheel drive and all-wheel drive (with or without Quattro unit), i.e., the all-wheel drive clutch can also be omitted in front-wheel drive applications.

For reasons of installation space, the electric machine 19 can be connected axially parallel to the powertrain 31 and the separating clutch 21 via a gear stage 26. The separating clutch 21 is located in the power flow after the gear stage 26 and before the powertrain 31. As a result, the gear losses and bearing drag torque losses are avoided when the separating clutch 21 is open. An integrated passive transfer mechanism 66 including bulkhead element 68, 70 prevents the clutches 1, 21 from splashing in the oil sump and realizes the clutch cooling. Both clutches 1, 21 are actuated by a mechanical actuator 12a, 12b, which are mounted on a central housing wall 29. The separating clutch 21 is thus operated from the rear and the Quattro clutch 1 from the front. This enables modularization in a simple manner.

In principle, in the case of the all-wheel clutch/all-wheel separating clutch (second clutch 1), which is intended to transmit a very high torque, the torque could be transmitted via a large lever transmission or a large number of plates 2, 3. However, in the front-wheel drive mode (i.e., all-wheel clutch open), there are high demands on a low drag torque, which requires a small number of plates and high contact pressure. Furthermore, the corner energy (engagement force times engagement travel) should be kept small in order to use actuators with low energy consumption. The lever actuator is provided here. Therefore, according to the embodiment, so-called integrated self-intensification is used.

The inner plate support (first support 35) is divided and connected to the hub via leaf springs 10. The leaf springs 10 are installed in the circumferential direction and transmit the entire torque. Furthermore, they enable an axial displacement of the inner plate support 35 (including the pressing plate 14) and can generate the necessary restoring force for the actuator 12b. The leaf springs 10 are installed in such a way that they have an arrangement when the clutch 1 is closed. The torque transmitted when the clutch 1 is closed, which is completely routed via the leaf springs 10, leads to an additional axial force which acts on the plate set 2, 3. Here, the circumferential force applied to the leaf springs 10 is converted into an additional axial force due to the axial positioning of the leaf springs 10 (FIG. 4). The leaf springs 10 are installed in such a way that the traction torque is increased. The intensification force is supported internally.

In the opposite torque direction (thrust direction), there is a reduction in the static pressing force and thus in the transmittable torque. The intensifying effect of the leaf springs 10 can be changed by varying the installation angle. Further parameters influencing the intensification are the coefficient of friction, the number of plates, the mean friction radius and the effective diameter of the leaf spring 10. However, these are largely determined by the installation space dimensions and can only be varied to a limited extent.

This solution of the lever-operated clutch 1 with self-intensification can generally be used in clutches 1 and is not necessarily tied to the separating clutch region. The actuator force is introduced via a lever mechanism 59. The lever mechanism 59 itself is supported by stud bolts 80 and transferred to the hub, which in turn is mounted on the shaft 18. The clutch 1 is consequently not actuated directly.

REFERENCE NUMERALS

1 Friction clutch/second clutch
2 First friction element of the friction clutch
3 Second friction element of the friction clutch
4 First clutch component of the friction clutch
5 Second clutch component of the friction clutch
6 Rotational axis
7 First support part
8 Second support part
9 Leaf spring unit
10 Leaf spring
11 Lever element
12a First lever actuator
12b Second lever actuator
13a First actuating force introduction mechanism
13b Second actuating force introduction mechanism
14 Pressing plate
15 Powertrain unit
17 Transmission
18 Input shaft
19 Electric machine
20 Rotor
21 Separating clutch/first clutch
22 Output shaft
23 Shim
24 Rotor rotational axis
25 Cardan shaft
26 Gear stage
27 Housing
28a First housing region
28b Second housing region
29 Housing wall
30 Transmission unit
31 Powertrain
32 Differential gear
33 Internal combustion engine
34 First module
35 First support of the friction clutch
36 Bearing base
37a First roller bearing
37b Second roller bearing
37c Third roller bearing
37d Fourth roller bearing
38 First receiving region
39 Second support of the friction clutch
40 Serration
41 First sleeve region
42a First actuating unit
42b Second actuating unit
43 Rotor shaft
44 Main housing component
45 Securing ring
46 Supporting bearing
47 Secondary housing component
48 First clutch component of the separating clutch
49 Second clutch component of the separating clutch
50a First support of the separating clutch
50b Second support of the separating clutch
51a First friction plate of the separating clutch
51b Second friction plate of the separating clutch
52 Control system
53 Second module
54 Clutch device
55a First actuating bearing
55b Second actuating bearing
56 Toothing
57 Gearwheel
58 Electric motor
59 Lever mechanism
60 Pivot bearing
61 Actuating member
62 Through hole
63 Fastening means
64 Counter supporting region
65 Bearing flange
66 Coolant delivery device
67a First coolant circuit
67b Second coolant circuit
68 First bulkhead element
69a First subspace of the first housing region
69b Second subspace of the first housing region
70 Second bulkhead element
71a First subspace of the second housing region
71b Second subspace of the second housing region
72a First subsystem
72b Second subsystem
73 Jet pump
74 Valve element
75 Second sleeve region 76 Base body
77 Supporting element
78 Bearing region
79 Transmission housing
80 Stud bolt
81 Bearing section
82 Rivet
83 Second receiving region
84 Opening
85 Third module
86a First discharge element
86b Second discharge element

The invention claimed is:

1. A friction clutch for a motor vehicle powertrain, comprising:
   a rotational axis;
   a reference plane aligned perpendicular to the rotational axis;
   an input shaft arranged for a rotationally fixed attachment to a transmission output shaft;
   a first clutch component comprising:
      a first friction element;
      a first support part that receives the first friction element;
      a leaf spring unit comprising a leaf spring; and
      a second support part rotationally fixed to:
         the first support part by the leaf spring unit; and
         the input shaft; and
   a second clutch component comprising:
      a second friction element; wherein:
   the first friction element lies against the second friction element in a frictionally locking manner in a closed position of the friction clutch;
   the first friction element is axially spaced from the second friction element in an open position of the friction clutch; and
   the leaf spring is designed and positioned relative to the reference plane in a set angle in the closed position such that an additional axial force is applied to the first friction element and the second friction element in a drive rotational direction of the first clutch component.

2. The friction clutch of claim 1, wherein the leaf spring unit comprises a plurality of leaf springs arranged to form a leaf spring assembly.

3. The friction clutch of claim 1, further comprising a plurality of leaf spring units arranged distributed along a circumference of the support parts.

4. The friction clutch of claim 1 wherein the leaf spring unit is arranged radially inside the friction elements.

5. The friction clutch of claim 1 further comprising:
   an actuating force introduction mechanism:
      operatively connected to an axial force actuator;
      received on the second support part; and
      comprising a lever element or a pressure pot.

6. The friction clutch of claim 5 wherein the actuating force introduction mechanism comprises a pressing plate:
   connected to the first support part; and
   arranged for acting on the first friction element and the second friction element in a displaceable manner.

7. A powertrain unit for a hybrid vehicle, comprising:
   a powertrain unit output shaft; and
   the friction clutch of claim 1 operatively arranged between the input shaft and the powertrain unit output shaft.

8. A transmission unit for a hybrid vehicle, comprising:
   the powertrain unit of claim 7; and
   a transmission comprising the transmission output shaft rotationally fixed to the input shaft.

9. The powertrain for the hybrid vehicle, comprising:
   the transmission unit of claim 8; and
   a differential gear coupled to the powertrain unit output shaft in a rotationally fixed manner.

* * * * *